Figure 6:
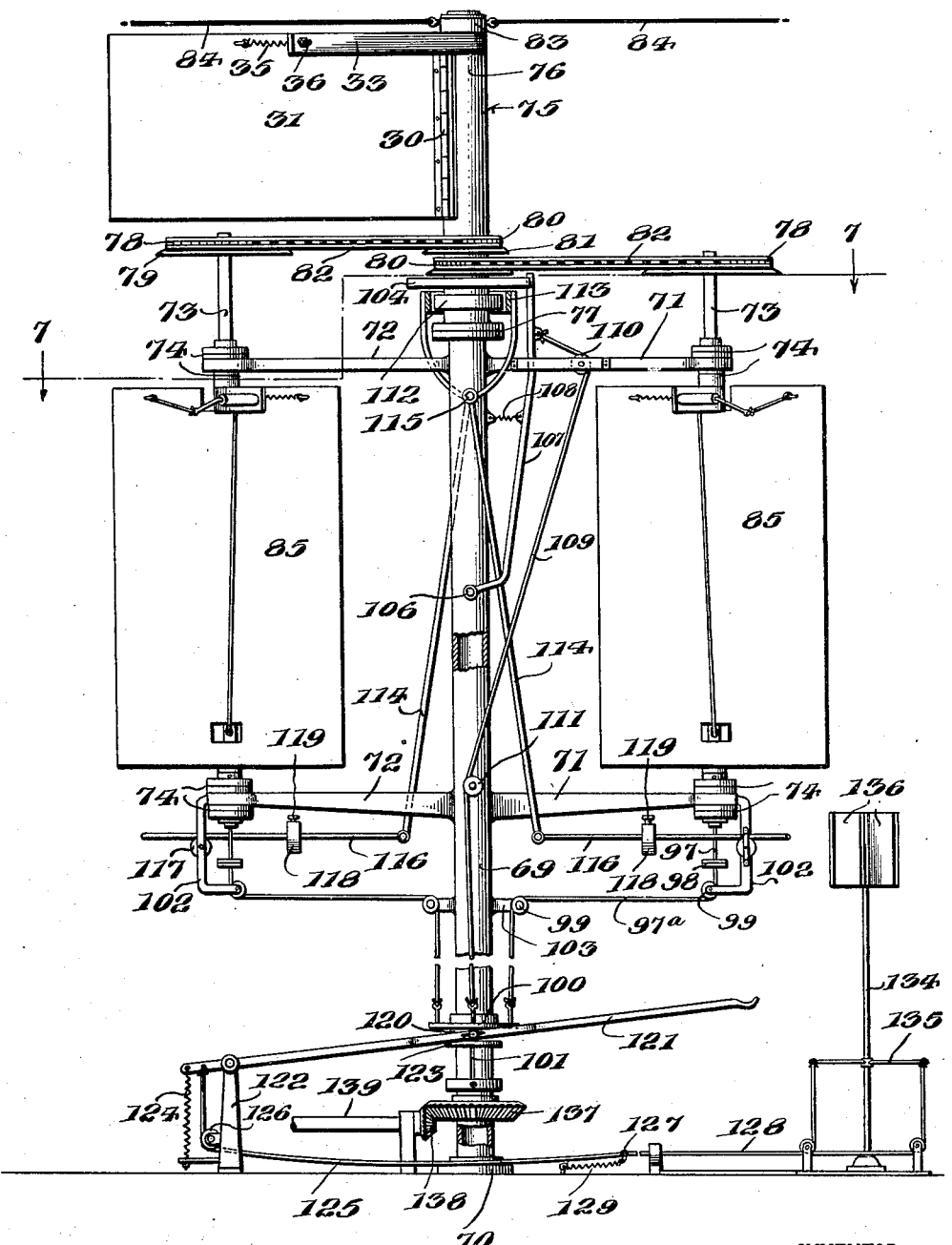

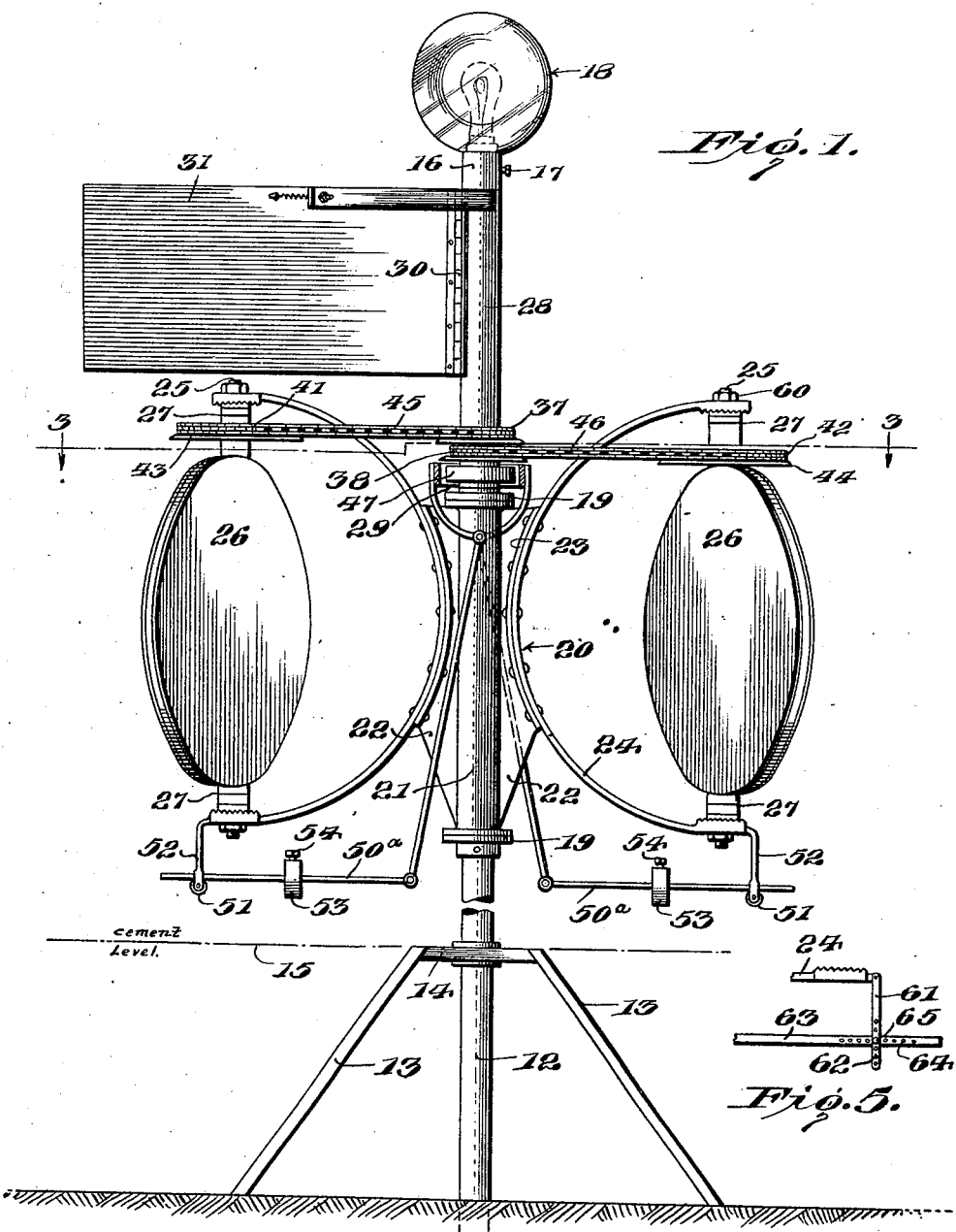

May 28, 1929. W. R. OLIPHANT 1,714,808
WIND MOTOR
Filed July 12, 1927 5 Sheets-Sheet 2
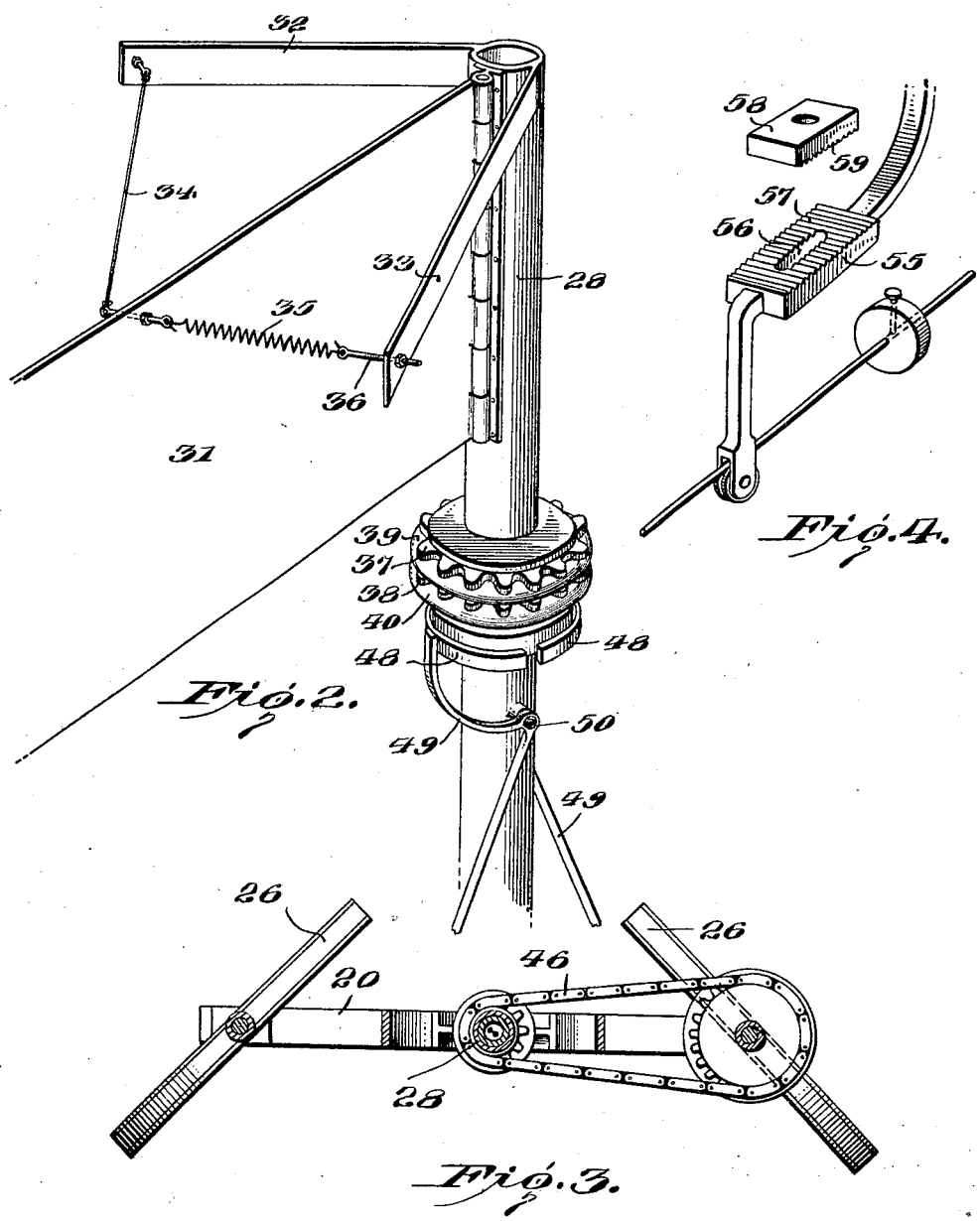
INVENTOR.
Walter R. Oliphant,
BY
Bacon & Thomas
ATTORNEY.

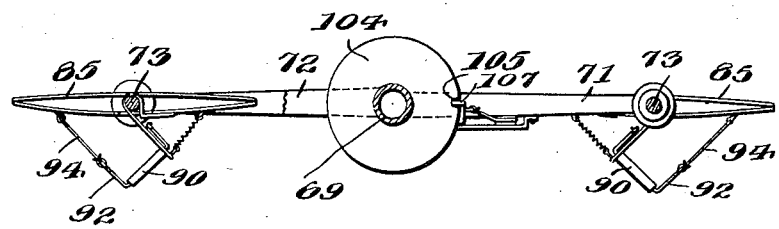
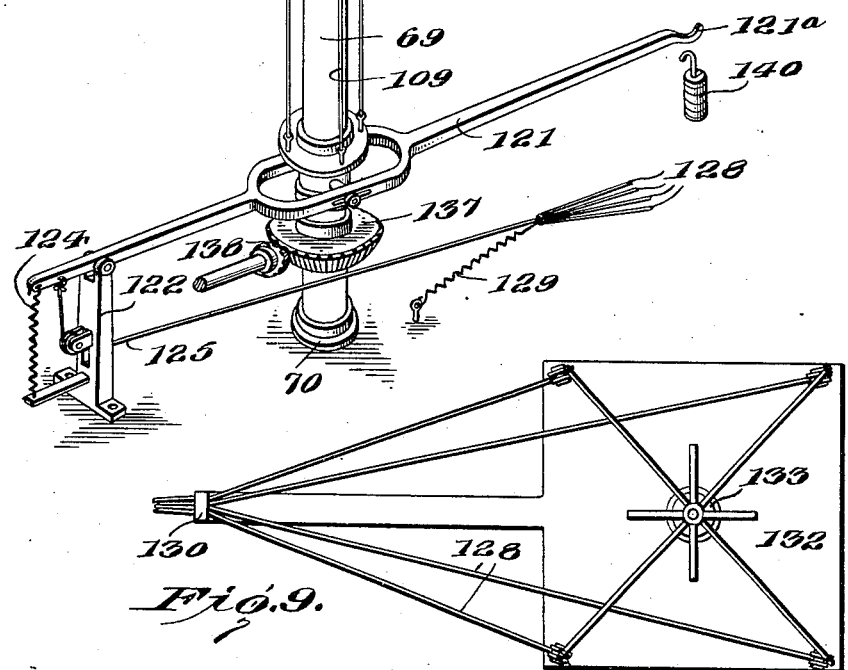

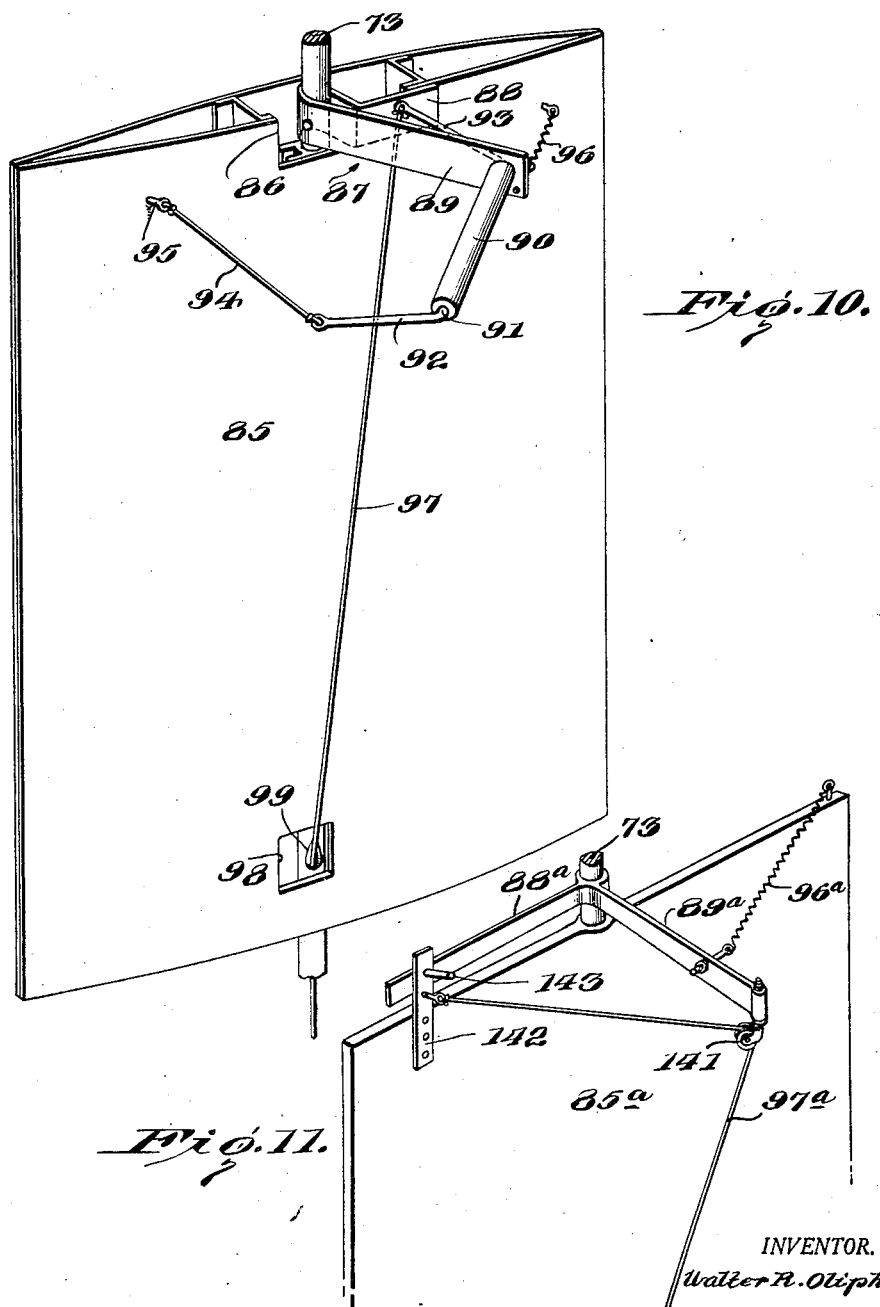

Patented May 28, 1929.

1,714,808

UNITED STATES PATENT OFFICE.

WALTER R. OLIPHANT, OF MARIETTA, OKLAHOMA.

WIND MOTOR.

Application filed July 12, 1927. Serial No. 205,116.

This invention relates to new and useful improvements in wind motors.

The primary object of this invention is to provide a wind motor which may be used either for displaying advertising matter or for the development of motive power.

A further object of the invention is to provide a wind motor with an automatic control which will prevent racing or running away of the same.

A further object of the invention is to provide means for controlling the operation of the motor whereby the same may be positively stopped when desired, as for instance during a strong wind which would have a tendency to wreck the device.

A still further object of the invention is to provide automatic mechanism which will actuate the aforementioned motor control should a strong wind arise without being noticed by the operator.

Other objects and advantages of the invention will be apparent during the course of the following description.

In the accompanying drawings forming a part of this specification and in which like numerals are employed to designate like parts throughout the same:

Figure 1 is a side elevational view showing one form of wind motor entirely assembled and in readiness for operation, Figure 2 is a detailed perspective view of a vane member and a portion of the associated control, Figure 3 is a horizontal sectional view taken upon line 3—3 of Figure 1, Figure 4 shows in detail a portion of a mechanism best illustrated in Figure 1, Figure 5 shows in detail a modification of a portion of the structure shown in Figures 1 and 4, Figure 6 shows in side elevation a modified form of wind motor embodying this invention, Figure 7 is a horizontal sectional view taken upon line 7—7 of Figure 6, Figure 8 shows in detail a portion of the motor control for the device completely illustrated in Figure 6, Figure 9 shows in detail a further portion of the control, Figure 10 shows in detail a portion of the blade control incorporated in the device shown in Figure 6, and Figure 11 shows in detail a modification of the structure set forth in Figure 10.

In the drawings, wherein for the purpose of illustration is shown a preferred embodiment of this invention, particular attention being had to Figures 1 to 4 inclusive, the numeral 12 designates a vertical post or standard suitably anchored and braced at its lower end by the struts 13 and cross head 14. It is to be understood that this lower portion of the post may be embedded in cement, earth, or the like, up to the line 15 if desired.

At the upper end of the post 12 there is mounted a socket 16, secured to the post by the set screw 17 having mounted thereon the lighting structure 18. This light will permit the device to be used as a traffic signal if so desired.

Rotatably mounted upon the post 12, by the bearing structures 19, is a carrier 20. It is to be understood that these bearings may be of any desired form and either plain or anti-frictional in character. The carrier 20 includes a sleeve portion 21 which is held concentric and out of contact with the post 12 by the bearings 19. Formed with the sleeve 21 are the webs 22 having suitably bolted or riveted to the curved portions 23 of the same the arcuate arms 24.

The outer ends of these arms have affixed thereto the stationary, vertical shafts 25. Rotatably mounted upon each of these shafts is a disc-like blade 26. Each blade is rotatably supported and held concentric with its shaft 25 by any suitable form of bearing structure located at the points designated by the characters 27.

Above the carrier 20, and rotably mounted upon the post 12, is a second carrier 28 which is supported at 29 upon the upper bearing 19. This carrier 28 has pivoted thereto by means of the hinge structure 30 a vane 31. The carrier 28 further has the diverging arms 32 and 33 rigidly connected thereto and arranged at any desired angle with respect to each other. Extending between the outer end of the arm 32 and the vane 31, and suitably connected to these two members is a cable 34. The spring 35 connects the vane 31 at the opposite side to the connection with the cable 34 and to the outer end of the arm 33 by the adjusting screw 36. The operation of this vane will be described at a later point.

The carrier 28 is formed with a pair of sprockets 37 and 38 having formed at their lower edges the chain guides 39 and 40 respectively. Cooperating sprockets 41 and 42 are connected to the blades 26, as best illustrated in Figure 1. These sprockets 41 and 42 are provided with chain guides 43 and 44 respectively which underlie the said sprockets. Chains 45 and 46 are trained over the sprockets 37—41 and 38—42, respectively.

The carrier 28 is further provided with a brake drum 47 located below the sprockets 37 and 38. Associated with the drum 47 are the brake shoes 48 carried by the upper arms of the substantially bell crank lever structures 49 which are pivoted at 50 to the sleeve portion 21 of the carrier 20. The lower arms of these bell crank levers have pivotally connected thereto the horizontally extending rods 50$^a$ which are slidably guided at their outer end portions by the rollers 51 rotatably mounted in bifurcated ends of the fingers 52 depending from the lower ends of the arcuate arms 24. Adjustably mounted upon the rods 50$^a$ are the weights 53 which are held in the proper positions by the set screws 54.

For the purpose of tightening the chains 45 and 46, the shafts 25 are laterally, adjustably connected to the ends of the arcuate arms 24. The specific type of adjusting means employed is best illustrated in Figure 4. Each end of each arcuate arm 24 is formed with a plate-like enlargement 55 having an elongated slot 56 formed therein and having its upper surface grooved or serrated, as at 57. It is to be understood that the shaft 25 extends through the slot 56. Associated with each enlargement 55 and mounted upon the shaft 25 is a plate 58 having its outer face grooved or serrated at 59 to correspond with the formation 57 on the enlargement 55. The nuts 60 threaded on the ends of the shafts 25 function to draw the respective plates 58 into engagement with the enlargements 55 so that the shafts 25 will be held in any desired adjusted position.

Figure 5 shows a slight modification which may be used instead of the rods 50$^a$, rollers 51 and fingers 52. This structure includes the end of an arm 24 and to this end is pivotally connected a link 61 having a series of apertures 62 formed in its free end. The rod 63 is substituted for the rod 50$^a$ in the structure shown in Figure 1. This rod 63 likewise is provided with a series of apertures 64 cooperating with the apertures 62 to permit a connecting bolt 65 to be employed for adjustably attaching the link 61 to the rod 63.

It is to be understood that the blades 26 may have suitable advertising data displayed on the opposite faces thereof so that the device may be employed along a road as an advertising sign and a traffic signal.

Figure 1 shows the lower end of the post 12 embedded in the ground and provided with an L connector 66 which joins to the post a conduit 67 through which electric wires 68 may extend. These wires start from a suitable source of supply and continue through the conduit 67 up the bore of the post 12 to the lighting structure 18.

The operation of this wind motor may be described as follows:

It is to be understood that the blades 26 are arranged with respect to each other so that they will feather in accordance with the direction of the wind to cause the latter to rotate the carrier 20 upon the post 12. It is considered that the operation of feathering blades is sufficiently understood by those familiar with the art so that a detailed explanation of their operation is deemed unnecessary. As the carrier 20 rotates about the post 12 the chain and sprocket structures will cause the blades 26 to feather so that one blade will be receiving the full force of the wind while the remaining blade is positioned edgewise to the direction of the wind or parallel therewith. The vane 31 naturally will be positioned parallel with the direction of the wind and will hold the carrier 28 stationary so that sprockets 37 and 38 likewise will be stationary.

Should the carrier 20 exceed a predetermined speed of rotation, the weights 53 will move outwardly, due to centrifugal force, for pivoting the bell crank levers 49. This movement of these levers will cause the brake shoes 48 to be applied to the brake drum 47. It being understood that the direction of rotation of the carrier 20 is always constant, namely, in a counter-clockwise direction when viewed from above, the drag of the brake shoes upon the drum 47 will cause the carrier 28 to partially rotate with the carrier 20. This rotation of the carrier 28 will cause the vane 31 to be moved out of its parallel position with respect to the direction of the wind if it were not for the spring connection 35. This spring permits the vane 31 to remain parallel with the wind during the shifting of the carrier 28 so that the sprockets 37 and 38, rigid with the carrier 28 will be advanced to arrange the blades 26 slightly out of balance with respect to the wind. This advancing of the feathering operation of the blades will reduce their effectiveness and bring about a slowing up of the speed of rotation of the carrier 20.

As the speed of the carrier 20 is reduced, the centrifugal governor operation performed by the weights 53 and their associated levers and links will disengage the shoes 48 from the drum 47 and the spring 35 then will draw the carrier 28 back into its proper relative position with respect to the vane 31 which, it will be remembered, has been parallel with the wind. This return of the carrier 28 to its proper position will retard the sprockets 37 and 38 for adjusting the blades 26 to cause the same to operate with their full degree of efficiency.

Figures 6 to 11 inclusive show a modified form of wind motor.

This motor includes a vertical, rotatable post 69 suitably journaled at its lower end in a bearing 70 mounted on any desired supporting surface. This post has formed rigid therewith the oppositely extending pairs of arms 71 and 72. To the outer ends of each pair of arms is journaled a vertical shaft 73 which is supported and held in position by suitable bearing structures 74. Above the post 69 is positioned a carrier 75 which includes a sleeve portion 76 rotatably supported upon the post 69 by the bearing structure 77. It is to be understood that the bearings 74 and 77 may be of any desired form and either plain or anti-frictional in character.

The upper ends of the shafts 73 are formed with sprockets 78 having chain guides 79 located below the same. The sleeve 76 of the carrier 75 is formed with sprockets 80 having chain guides 81 located below the same. Trained over the sprockets 78 and 80 are chains 82.

The sleeve 76 is provided with the same form of vane structure shown in Figures 1 and 2 and again need not be described in detail. The same reference characters will be applied to this vane structure.

To support the wind motor at its upper end, a collar 83 is provided and has connected thereto the guide wires 84.

Each shaft 73 has rotatably mounted thereon a blade 85 which is shown in detail in Figure 10. This latter figure clearly illustrates the upper edge of the blade 85 as being cut away at 86 opposite the shaft 73. Arranged in this cut-away portion and rigidly connected to the shaft 73 is a strap 87 having an angularly arranged arm 88 and a second, relatively long arm 89. It is to be understood that these diverging arms 88 and 89 may be arranged at any desired angle with respect to each other. The outer end of the arm 89 has rigidly connected thereto a tubular bearing 90. Journaled in this bearing is the intermediate portion 91 of a crank shaft structure including the crank arms 92 and 93. The arm 92 has connected to its free end the cable 94 which is connected at its remaining end to the blade 85 by means of the element 95. The blade 85 is further connected to the free end of the arm 89 by the spring 96 which functions to normally hold the blade in engagement with the arm 88 acting as a stop. The free end of the crank arm 93 has connected thereto a cable 97 which extends longitudinally of the blade and passes through an opening 98 formed in the latter. The shaft 73 also is formed with an opening, designated by the reference character 99, through which the cable 97 passes to permit the latter to extend through the bore of the shaft and leave the same at the lower end, as best illustrated in Figure 6. Each cable 97 is connected by means of a swivel structure 98 to a second cable 97ª which is trained over the rollers 99 and is connected at its free end to a sliding collar 100 mounted upon the post 69. This collar is connected with the post by means of the slot 101 and a suitable pin, not shown, for permitting the collar to be shifted longitudinally of the post but to be caused to rotate therewith. The rollers 99 are supported by suitable bracket structures 102 and 103 which are carried by the arms 71—72 and the post 69 respectively.

The carrier 75 has mounted thereon a disc 104 which is shown in Figure 7 as having a single peripheral notch 105 formed therein. Pivoted to the post 69, at 106 is a latch 107 having its free end bearing against disc 104 and held thereagainst by the spring 108. Connected to the latch 107 is a cable 109 which extends over the rollers 110 and 111 mounted in the manner best illustrated in Figure 6. The remaining end of this cable 109 is connected to the collar 100, as best illustrated in Figs. 6 and 8.

The carrier 75 is further provided with a brake drum 112 having associated therewith the brake shoes 113 carried by the upper ends of the bell crank levers 114. These levers are pivoted to the post 69 at 115. The free lower ends of the bell crank levers 114 are pivotally connected to the horizontally extending rods 116 which are slidably guided by the rollers 117 carried by the brackets 102. Weights 118 are adjustably mounted on the rods 116 and held in position by the set screws 119.

The collar 100 has loosely mounted thereon a ring 120 which is connected to the lever 121 pivoted to the stationary support 122. A sliding connection 123 is formed between the lever 121 and the ring 120 to permit the lever to be pivoted. The shorter end of this lever has connected thereto a spring 124 which normally functions to retain the lever in the position illustrated in Figure 6.

Connected to this shorter end of the lever is a cable 125 extending over the roller 126 and connected to a plurality of branch cables at 127. These branch cables will each be given the reference character 128. A spring 129 normally functions to pull upon the cable 125 to produce the slack illustrated in Figure 6.

The branch cables 128 extend through a guide 130 and pass around the relatively spaced rollers 131 which are supported upon a base plate 132. Universally connected to this base plate, as at 133, is a post 134 having the spider arms 135 mounted thereon and extending respectively in the directions of the rollers 131. The branch cables 128 are connected at their free ends to the respective spider arms 135. The upper end of the post 134 is formed with a plurality of angularly arranged blades 136. It is to be understood that any desired number of branch cables 128, rollers 131, spider arms 135 and blades 136 may be provided, the number of the same depending upon the desires of the manufacturer.

For the purpose of taking off power from this wind motor, the post 69 is provided with a beveled gear 137 meshing with a beveled pinion 138 carried by a power shaft 139.

Figure 8 shows a weight 140 which may be connected to the hooked end 121$^a$ of the lever 121 to hold this lever pivoted downwardly against the tension of the spring 124.

Figure 11 shows a modification of the structure illustrated in Figure 10. The shaft in this form has secured thereto for rotation a blade 85$^a$. The diverging arms 88$^a$ and 89$^a$ are mounted on the shaft 73 in the manner illustrated. The free end of the arm 89$^a$ has swiveled thereon a roller 141 over which is trained the cable 97$^a$. The free end of this cable is connected to a strap 142 mounted on the blade 85$^a$. This strap is further provided with a stop pin 143 adapted to engage the arm 89$^a$ when the cable 97$^a$ is pulled upon to shift the blade 85$^a$ upon its supporting shaft. A spring 96$^a$ connects the arm 89$^a$ and the blade 85$^a$ to normally hold the strap 142 in engagement with the arm 88$^a$.

The operation of this modified wind motor may be described as follows:

Starting with the motor in its stopped or inoperative position, as illustrated in Figure 6, the lever 121 is pivoted to lower the hooked end 121$^a$ of the same. The weight 140 is mounted upon the lowered end of the lever to hold the same in its adjusted position. The downward movement of the lever causes the collar 100 to be shifted downwardly with respect to the post 69 for pulling upon the cables 97 and 97$^a$. This downward movement of the cables causes the crank shaft structure 91, 92 and 93 to be actuated for moving the arm 92 downwardly. A downward movement of this crank arm produces a pull upon its respective cable 94 for causing the blade 85 to be shifted from its inoperative position to a position in engagement with the free end of the bearing 90. It is understood that the blades 85 are arranged parallel with the wind and the vane 31 when in their inoperative positions in engagement with the stop arms 88.

The downward movement of the collar 100 also produces a pull upon the cable 109 for shifting the latch 107 out of the notch formed in the disc 105. The post 69 and vane carrier 75 are now disconnected from each other.

The vane 31, of course, will be shifted into the wind or parallel with the direction of the wind and the movement of the vane carrier 75 will adjust the sprockets 80 so that the blades 85 will properly feather to cause the blade carrier, including the post 69, arms 71 and 72, etc., to rotate. The chains 82 with their supporting sprockets will cause the blades to feather with respect to the wind due to the travel of the blade carrier with respect to the vane carrier 75.

Should the speed of the blade carrier become excessive, the centrifugal governor structure including the weights 118, their supporting rods 116 and the bell crank levers 114, will operate for applying the brake shoes 113 to the drum 112. The application of this brake structure will cause the vane carrier 75 to be shifted in the direction of rotation of the blade carrier for advancing the sprockets 80. This advancing of the sprockets will adjust the feathering blades 85 so that they will not operate to their full degree of efficiency, or in other words, the blades will partially buck the wind. The spring connection 35 between the arm 33 and the vane 31 will permit the vane carrier 75 to be shifted in the aforementioned manner without shifting the vane 31 out of the wind. When the speed of the blade carrier returns to normal, the brake shoes will be disengaged and the spring 35 will return the vane carrier 75 to its proper position with respect to the vane. This movement of the carrier 75 will retard the sprockets 80 for readjusting the blades 85 so that they will properly feather with the wind.

To insure against the motor being damaged during a heavy wind, the following automatic mechanism is provided.

The post 134 with the blades 136 will be bent over upon its universal mounting 133 by the application of the excessive wind on the blades 136. This pivoting of the post 134 will cause one or more of the branch cables 128 to be pulled upon for exerting a pull upon the cable 125. The movement of this latter cable will cause the lever 121 to be pivoted for raising the longer end of the same against the pull of the weight 140. The upward movement of the lever 121 will release the cables 97 and 97$^a$ so that the springs 96 may return the blades 85 to their inoperative positions against the stop arms 88. It will be noted that irrespective of the direction from which a strong wind approaches, the post 134 will be bent over or pivoted and one or more branch cables 128 operated.

The openings 98 and 99 formed in the blades 85 and shafts 73 respectively will permit the blades to pivot with respect to the cables 97 without binding against the latter. The swivels 98 connecting the cables 97 and 97$^a$ will permit rotation or twisting of the cables 97 with respect to the cables 97$^a$ during the rotation of the blades 85.

To stop the wind motor, the weight 140 may be removed from the lever 121 and the blades 85 then return to their inoperative positions. The upward movement of the lever 121 also releases the latch 107 for permitting the spring 108 to cause the latch to engage the disc 104. During the movement of the blade carrier with respect to the disc, the latch 107 will register with the notch 105 and bring the inoperative blades 85 into parallelism or alignment with the vane 31. Further shifting of the carrier 75, due to the effect of shifting winds upon the vane 31, will cause the blade carrier to be shifted so that both blades will feather with the wind.

It is to be understood that the mechanism may be readjusted so that a downward movement of the longer end of the lever 121 will cause the wind motor to stop rather than start. The only adjustments that need be made to the mechanism are the shifting of the shafts 73 with respect to the vane carrier 75 so that the blades will be parallel with the wind when engaging the outer ends of the bearings 90 and the shifting of the point of connection between the cable 125 and the lever 121 to the opposite side of the lever fulcrum.

It is to be understood that the forms of this invention herewith shown and described are to be taken as preferred examples of the same and that various changes in the shape, size, and arrangement of parts may be resorted to without departing from the spirit of the invention or the scope of the subjoined claims.

Having thus described my invention what I claim is:

1. In a device of the type described, a support, a blade carrier rotatable with respect to the support, blades rotatably carried by the carrier, a vane carrier rotatably supported with respect to the blade carrier, a vane on the latter carrier, mechanical connections between the blades and the vane carrier for causing the blades to feather as their carrier rotates with respect to the vane carrier and for causing shifting of the vane to adjust the blades correspondingly, and mechanism including a centrifugal governor bodily carried by the blade carrier and the brake carried partly by each carrier for limiting the speed of rotation of the blade carrier.

2. In a device of the type described, a support, a blade carrier rotatably mounted with respect to the support, blades rotatably carried by the carrier on axes extending parallel with the axis of their carrier, a vane carrier rotatably supported co-axially with respect to the blade carrier, a vane mounted on the latter carrier, chain and sprocket mechanism connecting the blades and the vane carrier for causing the blades to feather as their carrier rotates with respect to the vane carrier and for causing shifting of the vane to adjust the blades correspondingly, and mechanism including a centrifugal governor bodily carried by the blade carrier and the brake carried partly by each carrier for limiting the speed of rotation of the blade carrier.

3. In a device of the type described, a support, a blade carrier rotatably mounted with respect to the support, blades rotatably carried by the carrier on axes extending parallel with the axis of their carrier, a vane carrier rotatably supported co-axially with respect to the blade carrier, a vane mounted on the latter carrier, chain and sprocket mechanism connecting the blades and the vane carrier for causing the blades to feather as their carrier rotates with respect to the vane carrier and for causing shifting of the vane to adjust the blades correspondingly, and mechanism for limiting the speed of rotation of the blade carrier, said speed limiting mechanism including a brake structure interposed between the blade and vane carriers and centrifugal weight mechanism for applying the brake structure.

4. In a device of the type described, a support, a blade carrier rotatable with respect to the support, blades rotatably mounted on the carrier, a vane carrier rotatably supported with respect to the blade carrier, a vane pivotally connected to the vane carrier, means for yieldably holding the vane in one position with respect to the vane carrier and permitting the vane carrier to partially rotate in one direction with respect to the vane, chain and sprocket mechanism connecting the blades and the vane carrier for causing the blades to feather as their carrier rotates with respect to the vane carrier and for causing shifting of the vane due to a change in the direction of the wind to adjust the blades correspondingly, and mechanism for limiting the speed of rotation of the blade carrier.

5. In a device of the type described, a support, a blade carrier rotatable with respect to the support, blades rotatably mounted on the carrier, a vane carrier rotatably supported with respect to the blade carrier, a vane pivotally connected to the vane carrier, means for yieldably holding the vane in one position with respect to the vane carrier and permitting the vane carrier to partially rotate in one direction with respect to the vane, chain and sprocket mechanism connecting the blades and the vane carrier for causing the blades to feather as their carrier rotates with respect to the vane carrier and for causing shifting of the vane due to a change in the direction of the wind to adjust the blades correspondingly, and mechanism for limiting the speed of rotation of the blade carrier, said last mentioned mechanism including a centrifugal brake connection between the vane and blade carries whereby excessive speed of rotation of the blade carrier will cause the vane carrier to rotate in the direction of rotation of the blade carrier, said connection between the vane and its carrier permitting the carrier to be rotated as aforesaid without shifting the vane out of parallelism with the wind.

6. In a device of the type described, a support, a rotatable blade carrying structure, a vane carrier rotatably supported with respect to the blade carrier, a vane pivoted to the vane carrier, means for preventing pivoting of the vane in one direction, resilient means for including a centrifugal governor bodily carried by the blade carrier and a brake carried partly by each carrier pivoting of the vane in the opposite direction, and a centrifugal brake mechanism for interconnecting the rotatable blade carrier and the vane carrier for causing excessive speed of the blade support to rotate the vane carrier with the blade support and in a direction permitting the vane to remain parallel with the wind during the shifting of the vane carrier.

7. In a device of the type described, a support, a blade carrier rotatable with respect to the support, blades rotatably mounted on the carrier, a vane carrier rotatably supported with respect to the blade carrier, a vane on the latter carrier, mechanical connections between the blades and the vane carrier for causing the blades to feather as their carrier rotates with respect to the vane carrier and for causing shifting of the vane to adjust the blades correspondingly, mechanism for limiting the speed of rotation of the blade carrier, and additional mechanism for starting and stopping the motor.

8. In a device of the type described, a support, a blade carrier rotatable with respect to the support, blades rotatably mounted on the carrier, a vane carrier rotatably supported with respect to the blade carrier, a vane on the latter carrier, mechanical connections between the blades and the vane carrier for causing the blades to feather as their carrier rotates with respect to the vane carrier and for causing shifting of the vane to adjust the blades correspondingly, mechanism for limiting the speed of rotation of the blade carrier, additional mechanism for starting and stopping the motor, and a wind controlled governor for automatically operating the last mentioned mechanism for stopping the motor during excessive wind pressure.

9. In a device of the type described, a support, a blade carrier rotatable with respect to the support, blades rotatably mounted on the carrier, a vane carrier rotatably supported with respect to the blade carrier, a vane on the latter carrier, mechanical connections between the blades and the vane carrier for causing the blades to feather as their carrier rotates with respect to the vane carrier and for causing shifting of the vane to adjust the blades correspondingly, mechanism for limiting the speed of rotation of the blade carrier, additional mechanism for starting and stopping the motor, and a wind controlled governor for automatically operating the last mentioned mechanism for stopping the motor during excessive wind pressure, said wind controlled governor including a vertical post pivoted for universal movement, blades carried by the post and connections between the post and the starting and stopping control mechanism for actuating the latter when the governor post is pivoted.

10. In a device of the type described, a support, a blade carrier rotatable with respect to the support, blades rotatably mounted on the carrier, a vane carrier rotatable with respect to the blade carrier, a vane on the latter carrier, chain and sprocket mechanism connecting the blades and the vane carrier for causing the blades to feather as their carrier rotates with respect to the vane carrier and for causing shifting of the vane to adjust the blades correspondingly, a centrifugal governor brake mounted on said carriers for limiting the speed of rotation of the blade carrier, and mechanism for shifting the blades from an inoperative to an operative position, or vice versa, for starting and stopping the motor.

11. In a device of the type described, a support, a blade carrier rotatable with respect to the support, blades rotatably mounted on the carrier, a vane carrier rotatable with respect to the blade carrier, a vane on the latter carrier, chain and sprocket mechanism connecting the blades and the vane carrier for causing the blades to feather as their carrier rotates with respect to the vane carrier and for causing shifting of the vane to adjust the blades correspondingly, a centrifugal governor brake for limiting the speed of rotation of the blade carrier, mechanism for shifting the blades from an inoperative to an operative position, or vice versa, for starting and stopping the motor, and a latch mechanism for connecting the blade and vane carriers so that the blades when in their inoperative positions will align with the vane irrespective of the direction in which the vane extends.

12. In a device of the type described, a support, a blade carrier rotatable with respect to the support, shafts journalled on the carrier, blades journaled on the shafts, means for moving the blades with respect to their shafts, a vane carrier rotatably supported with respect to the blade carrier, a vane on the latter carrier, chain and sprocket mechanism connecting the shafts and the vane carrier for causing the blades to feather as their carrier rotates with respect to the vane carrier, manually operable means for controlling the means for moving the blades with respect to their shafts for starting and stopping of the motor, a wind actuated governor for operating the manual control to stop the motor during excessive wind pressure, and a centrifugal governor mounted on the blade carrier for controlling the speed of rotation of the blade carrier.

13. In a device of the type described, a support, a blade carrier rotatable with respect to the support, blades rotatably carried by the carrier, a vane carrier rotatably supported with respect to the blade carrier, a vane on the latter carrier, mechanical connections between the blades and the vane carrier for causing the blades to feather as their carrier rotates with respect to the vane carrier and for causing shifting of the vane to adjust the blades correspondingly, a brake drum mounted on the vane carrier, a lever mounted on the blade carrier and having a brake shoe for the drum, and a centrifugally operated weight for actuating the lever for controlling the speed of rotation of the blade carrier.

14. In a device of the type described, a support, a blade carrier rotatable with respect to the support, blades rotatably carried by the carrier, a vane carrier rotatably supported with respect to the blade carrier, a vane on the latter carrier, mechanical connections between the blade and the vane carrier for causing the blades to feather as their carrier rotates with respect to the vane carrier and for causing shifting of the vane to adjust the blades correspondingly, and means for shifting the vane carrier without moving its vane out of parallelism with the wind for limiting the speed of rotation of the blade carrier.

15. In a device of the type described, a support, a blade carrier rotatable with respect to the support, blades rotatably mounted on the carrier, a vane carrier rotatably supported with respect to the blade carrier, a vane on the vane carrier, chain and sprocket mechanism connecting the blades and the vane carrier for causing the blades to feather as their carrier rotates with respect to the vane carrier and for causing shifting of the vane to adjust the blades correspondingly, means for shifting the blades with respect to their carrier for tightening said chains, a brake drum mounted on the vane carrier, a lever mounted on the blade carrier and having a brake shoe for the drum, and a centrifugally operated weight actuating the lever for controlling the speed of rotation of the blade carrier.

16. In a device of the type described, a support, a blade carrier rotatable with respect to the support, blades rotatably mounted on the carrier, a vane carrier rotatably supported with respect to the blade carrier, a vane on the vane carrier, chain and sprocket mechanism connecting the blades and the vane carrier for causing the blades to feather as their carrier rotates with respect to the vane carrier and for causing shifting of the vane to adjust the blades correspondingly, means for shifting the blades with respect to their carrier for tightening said chains, and means for shifting the vane carrier without moving its vane out of parallelism with the wind for limiting the speed of rotation of the blade carrier.

In testimony whereof I affix my signature.

WALTER R. OLIPHANT.